No. 632,623. Patented Sept. 5, 1899.
F. BARTLETT.
BICYCLE DRIVING GEAR.
(Application filed Oct. 29, 1898.)

(No Model.)

Witnesses:

Inventor
Frank Bartlett
by R. S. & B. Lacey his Attorneys

THE NORRIS PETERS CO., PHOTO-LITHO., WASHINGTON, D. C.

UNITED STATES PATENT OFFICE.

FRANK BARTLETT, OF OSAWATOMIE, KANSAS.

BICYCLE DRIVING-GEAR.

SPECIFICATION forming part of Letters Patent No. 632,623, dated September 5, 1899.

Application filed October 29, 1898. Serial No. 694,945. (No model.)

*To all whom it may concern:*

Be it known that I, FRANK BARTLETT, a citizen of the United States, residing at Osawatomie, in the county of Miami and State of Kansas, have invented certain new and useful Improvements in Bicycle Driving-Gear; and I do hereby declare the following to be a full, clear, and exact description of the invention, such as will enable others skilled in the art to which it appertains to make and use the same.

This invention relates to improvements in driving-gear for bicycles; and the object is to provide an improved construction of gearing in which the employment of a crank-shaft is dispensed with and the power applied directly to the drive-chains.

The invention is illustrated in the accompanying drawings, in which—

Figure 1:
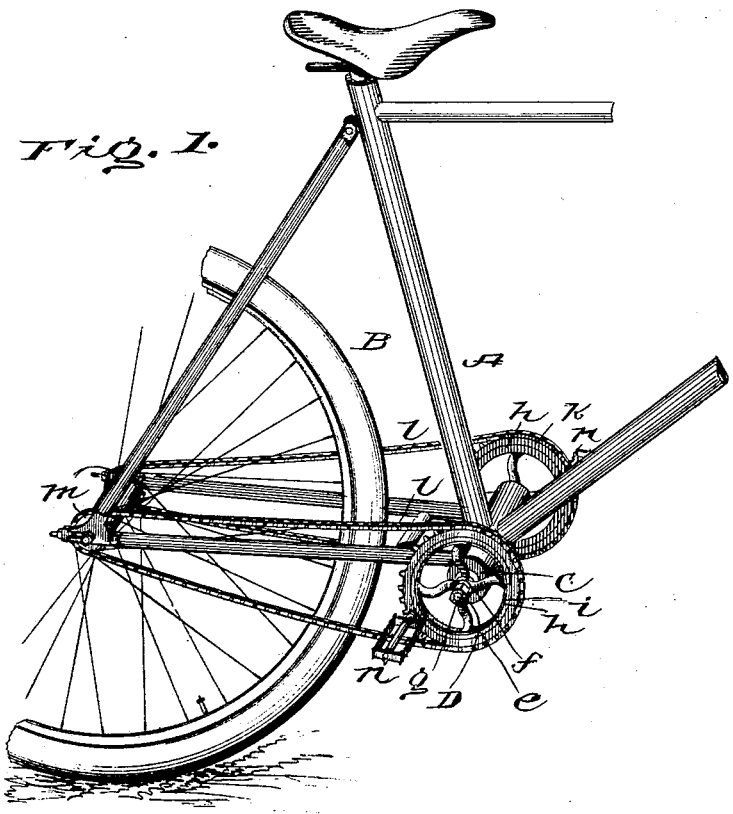
Figure 2:
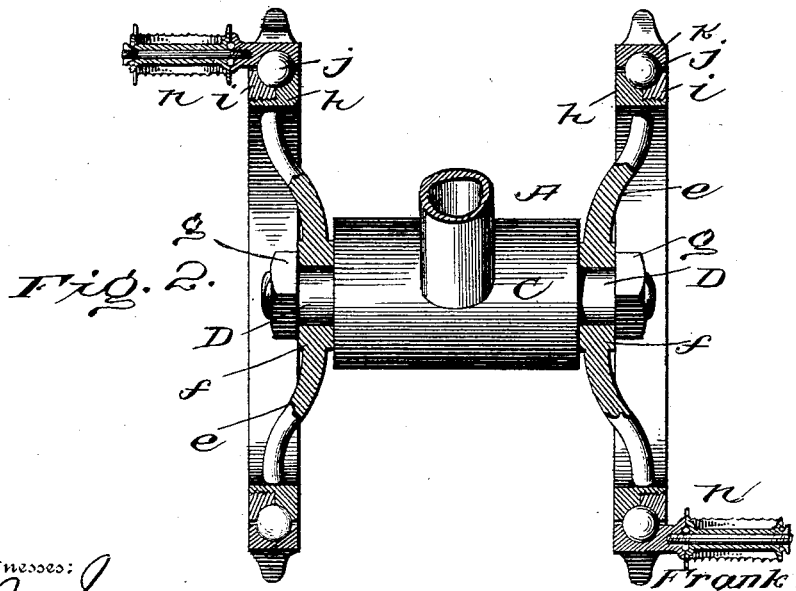

Figure 1 is a perspective view of a portion of the frame and drive-wheel of a bicycle, showing my invention applied thereto. Fig. 2 is a vertical transverse section through the frame and sprocket-wheels.

Referring now more particularly to the drawings, A represents a portion of the frame of a bicycle of usual construction, and B the rear drive-wheel.

In carrying out my invention I employ a hanger C, from the ends of which project stub-shafts D, formed integrally with or secured to said hanger or constituting the ends of a stationary shaft projecting therethrough. Upon each stub-shaft is mounted a drive-sprocket composed of a stationary spider or bearing member and a driver or revoluble sprocket-rim. The spider comprises in its construction a series of radial spokes or arms $e$, united at their inner ends to a central sleeve or hub $f$, keyed or otherwise secured against rotation to the shaft. If desired, the parts may be constructed so that the hub can be slid laterally on and off the shaft and held in position by nuts $g$. A rim $h$ is carried by the spokes or arms, and this rim is cut away at one side of its center entirely around its circumference and threaded to receive a retaining-ring $i$, the outer portions of the meeting faces of said parts being in the same circumferential plane and concaved to form an annular semicircular groove in which a series of antifriction-balls $j$ are adapted to travel. The spokes are preferably curved outward or laterally, so as to avoid the use of long stub-shafts and yet project the rim far enough beyond the frame to insure that the rider's feet can travel freely through the circular path without encountering an obstacle.

Revolubly mounted on the rim is a sprocket-ring $k$, provided around its internal circumference with a groove which completes the formation of a circular raceway for the balls which serve as antifriction-bearings for said ring. Both the balls and sprocket-ring are held in position by the retaining-ring $i$, and by screwing the latter in or out the balls may be adjusted as desired. Around the toothed rims of the sprockets thus constructed are passed chains $l$, which communicate motion therefrom to sprocket-pinions $m$ on the axle of the rear wheel, the gearing being duplicated on opposite sides of the bicycle, as shown.

Instead of mounting pedal-cranks upon the shaft as heretofore, I dispense with such cranks altogether and mount the pedals $n$ directly upon the sprocket-rings, the application of the two rings being at diametrically opposite points, so that when one is up to the highest point the other will be down to the lowest point. By this means a much more steady and direct force is attained and a correspondingly greater amount of pressure can be exerted, whereby high-geared machines may be easily driven and great speed thus secured.

From the foregoing it will be readily understood that the balls $j$ form interlocking means between the rim-sections $k$ and $h\,i$, as well as reducing the friction between these parts to a minimum amount. The sides or outer faces of the rim-sections are about flush, presenting a neat finish, and obviates projecting parts, which is objectionable. The ring $i$ corresponds approximately to the cut-away portion of the rim $h$ and occupies the space produced by the cutting away of the said rim $h$. The seat formed in the inner surface of the rim $k$ is semicircular, and the seat formed in the parts $h$ and $i$ when assembled is likewise of semicircular form, the two seats providing a race of circular form. The semicircular seat of the inner rim-section is equally divided upon its parts $h$ and $i$, so as to equalize the strain and pressure thereon.

It will of course be understood that changes in the form, proportion, and minor details of construction may be made within the scope of the invention without departing from the spirit or sacrificing any of the advantages thereof.

Having thus described the invention, what is claimed as new is—

In combination with the drive-wheel and crank-hanger of a bicycle or the like, the drive-wheel hub having sprocket-pinions at its ends, and the crank-hanger having fixed stub-shafts at its ends, of drive elements consisting of hubs mounted upon the fixed stub-shafts, outwardly-bowed spokes radiating from the hubs, rims connecting the spokes and having a portion cut away to a medial line and threaded, rings corresponding with the cut-away portions and making screw-thread connection therewith, toothed drivers encircling the rims and rings, antifriction-balls seated in the circular raceways formed by registering semicircular grooves in the meeting faces of the rim-sections and toothed drivers, pedals applied to the drivers and disposed at diametrically opposite points, sprocket-chains connecting the toothed drivers with the sprocket-pinions of the drive-wheel, and nuts mounted upon the projecting threaded ends of the stub-shafts and clamping the bearing elements between them and the terminals of the crank-hanger, substantially as set forth.

In testimony whereof I affix my signature in presence of two witnesses.

FRANK BARTLETT.

Witnesses:
F. L. GUTHRIE,
FRANK PYLE.